US012159226B2

(12) United States Patent
Hopkins et al.

(10) Patent No.: US 12,159,226 B2
(45) Date of Patent: Dec. 3, 2024

(54) APPARATUS AND METHOD FOR BOUNDARY LEARNING OPTIMIZATION

(71) Applicant: THE REGENTS OF THE UNIVERSITY OF CALIFORNIA, Oakland, CA (US)

(72) Inventors: Jonathan Hopkins, Los Angeles, CA (US); Ali Hatamizadeh, Los Angeles, CA (US); Yuanping Song, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 975 days.

(21) Appl. No.: 17/139,800

(22) Filed: Dec. 31, 2020

(65) Prior Publication Data

US 2021/0241100 A1    Aug. 5, 2021

Related U.S. Application Data

(63) Continuation of application No. PCT/US2019/042538, filed on Jul. 19, 2019.
(Continued)

(51) Int. Cl.
*G06N 3/08* (2023.01)
*G06N 3/04* (2023.01)

(52) U.S. Cl.
CPC ............ *G06N 3/08* (2013.01); *G06N 3/04* (2013.01)

(58) Field of Classification Search
CPC ........................................ G06N 3/08
(Continued)

(56) References Cited

U.S. PATENT DOCUMENTS 7,096,207 B2 * 8/2006 Kim .................. G06F 18/28
706/45
7,996,344 B1  8/2011 Goel
(Continued)

FOREIGN PATENT DOCUMENTS

WO    2020086130 A2    4/2020

OTHER PUBLICATIONS

Hatamizadeh, Ali et al., "Optimizing the Geometry of Flexure System Topologies Using the Boundary Learning optimization Tool", Hindawi, Mathematical Problems in Engineering, vol. 2018, Article ID 1058732, 14 pages, Mar. 29, 2018. (Year: 2018).*
(Continued)

*Primary Examiner* — Reza Nabi
(74) *Attorney, Agent, or Firm* — O'BANION & RITCHEY LLP; John P. O'Banion

(57) ABSTRACT

A boundary learning optimization tool for training neural networks with accurate models of parameterized flexure using a minimal number of numerically generated performance solutions generated from different design instantiations of those topologies. Performance boundaries are output by the neural network in optimization steps, with geometric parameters varied from smallest allowable feature sizes to largest geometrically compatible feature sizes for given constituent materials. The plotted performance boundaries define the design spaces of flexure systems toward allowing designers to visually identify which geometric versions of their synthesized topologies best achieve desired combinations of performance capabilities.

18 Claims, 9 Drawing Sheets

Related U.S. Application Data

(60) Provisional application No. 62/701,643, filed on Jul. 21, 2018.

(58) Field of Classification Search
USPC .......................................................... 706/25
See application file for complete search history.

(56) References Cited

U.S. PATENT DOCUMENTS

| | | | | |
|---|---|---|---|---|
| 8,489,522 | B1* | 7/2013 | Hirsch | G06N 20/00 706/26 |
| 10,996,372 | B2* | 5/2021 | Denli | G01V 20/00 |
| 11,070,441 | B2* | 7/2021 | Di Pietro | H04L 41/22 |
| 11,427,215 | B2* | 8/2022 | Wang | H04W 4/40 |
| 11,611,457 | B2* | 3/2023 | D'Oro | H04L 1/0015 |
| 11,783,453 | B2* | 10/2023 | Krishnamoorthy | G06N 3/045 382/100 |
| 2003/0079188 | A1* | 4/2003 | McConaghy | G06F 30/36 716/135 |
| 2006/0287024 | A1* | 12/2006 | Griffith | A63B 71/02 463/3 |
| 2007/0087756 | A1* | 4/2007 | Hoffberg | G06Q 10/06375 455/450 |
| 2014/0073977 | A1* | 3/2014 | Grady | A61B 5/14535 600/504 |
| 2014/0309974 | A1* | 10/2014 | Ho | G16C 20/70 703/2 |
| 2016/0321384 | A1* | 11/2016 | Pal | B33Y 50/02 |
| 2017/0287137 | A1* | 10/2017 | Lin | G06V 10/454 |
| 2018/0357552 | A1* | 12/2018 | Campos | G06N 5/043 |
| 2019/0279043 | A1* | 9/2019 | Cataltepe | G06F 18/40 |
| 2020/0024792 | A1* | 1/2020 | Lee | D06F 33/44 |
| 2020/0042610 | A1* | 2/2020 | Boles | G06Q 30/0244 |
| 2020/0195506 | A1* | 6/2020 | Peng | H04W 24/10 |
| 2021/0117860 | A1* | 4/2021 | Ergen | G06F 9/5072 |
| 2021/0241100 | A1* | 8/2021 | Hopkins | G06N 3/04 |
| 2021/0256418 | A1* | 8/2021 | Creedon | G06N 3/08 |
| 2022/0043179 | A1* | 2/2022 | Ghosh | G06N 20/00 |
| 2022/0215256 | A1* | 7/2022 | Song | G06N 3/08 |
| 2022/0292240 | A1* | 9/2022 | Murphy | G06F 30/27 |
| 2022/0292543 | A1* | 9/2022 | Henderson | G06Q 30/0252 |
| 2022/0300868 | A1* | 9/2022 | Wan | G06N 20/00 |
| 2022/0318621 | A1* | 10/2022 | Gong | G06N 3/006 |
| 2022/0339739 | A1* | 10/2022 | Tatzel | B23K 26/032 |
| 2023/0022100 | A1* | 1/2023 | Chen | G06N 3/0464 |
| 2023/0046653 | A1* | 2/2023 | Joblin | G06N 3/006 |
| 2023/0052401 | A1* | 2/2023 | Palma | G16H 30/40 |
| 2023/0083724 | A1* | 3/2023 | Cella | G06Q 20/389 705/28 |
| 2023/0152787 | A1* | 5/2023 | Ba | G06N 3/08 700/108 |
| 2023/0169325 | A1* | 6/2023 | Xie | G06N 3/09 706/15 |
| 2023/0169397 | A1* | 6/2023 | Smith | G06F 21/57 706/12 |
| 2023/0189319 | A1* | 6/2023 | Akdeniz | G06N 3/084 370/329 |
| 2023/0196096 | A1* | 6/2023 | Milne | G06N 3/047 706/25 |
| 2023/0222454 | A1* | 7/2023 | Cella | G06N 7/01 705/28 |
| 2023/0366687 | A1* | 11/2023 | Fernandez Gonzalez | G06N 20/00 |
| 2024/0028974 | A1* | 1/2024 | Gottin | G06N 3/0495 |
| 2024/0031427 | A1* | 1/2024 | Wang | H04L 67/10015 |

OTHER PUBLICATIONS

ISA/US, United States Patent and Trademark Office (USPTO), International Search Report and Written Opinion issued May 7, 2020, related PCT international applicaiton No. PCT/US2019/042538, pp. 1-9, claims searched, pp. 10-13.

Hatamizadeh, Ali et al., "Optimizing the Geometry of Flexure System Topologies Using the Boundary Learning Optimization Tool", Hindawi, Mathematical Problems in Engineering, vol. 2018, Article ID 1058732, 14 pages, Mar. 29, 2018.

Hatamizadeh, Ali et al., "Geometry Optimization of Flexure System Topologies Using the Boundary Learning Optimization Tool (BLOT)." Proceedings of the ASME 2017 International Design Engineering Technical Conferences and Computers and Information in Engineering Conference. vol. 5A: 41st Mechanisms and Robotics Conference. Cleveland, Ohio, USA, Aug. 6-9, 2017, pp. 1-11.

* cited by examiner

FIG. 1A  FIG. 1B  FIG. 1C

APPARATUS AND METHOD FOR BOUNDARY LEARNING OPTIMIZATION

CROSS-REFERENCE TO RELATED APPLICATIONS

This application claims priority to, and is a 35 U.S.C. § 111(a) continuation of, PCT international application number PCT/US2019/042538 filed on Jul. 19, 2019, incorporated herein by reference in its entirety, which claims priority to, and the benefit of, U.S. provisional patent application Ser. No. 62/701,643 filed on Jul. 21, 2018, incorporated herein by reference in its entirety. Priority is claimed to each of the foregoing applications.

The above-referenced PCT international application was published as PCT International Publication No. WO 2020/086130 A2 on Apr. 30, 2020, which publication is incorporated herein by reference in its entirety.

STATEMENT REGARDING FEDERALLY SPONSORED RESEARCH OR DEVELOPMENT

This invention was made with Government support under FA9550-15-1-0321, awarded by the U.S. Air Force Office of Scientific Research. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to physical design modeling, and more particularly to a boundary learning optimization tool for physical design optimization in neural nets.

2. Background Discussion

A multi-objective optimization problem (MOOP) deals with more than one objective function and aims at finding a set of solutions that optimizes all the objective functions simultaneously. Several deterministic methods have been proposed to solve the local or global optimal solution, for example: the weighting method, E-Constraint method, global criterion method, achievement scalarizing function approach, with other solving methods including normal boundary intersection, evolutionary algorithm, lexicographic ordering, and goal programming.

However, these traditional deterministic methods only guarantee finding a local optimal solution. In order to achieve a more reliable global optimal solution, the more recent MOOP methods focus on stochastic algorithms, including a variety of evolutionary algorithms. These MOOP methods generate more reliable global Pareto-optimal solution sets, yet require significantly increased function evaluations and larger computation times which are generally better suited for performing complex black-box-model optimizations.

Accordingly, a need exists for a physical design optimization tool which ensures good reliability toward achieving global optimal solutions while maintaining high calculation efficiency. The present disclosure fulfills that need and provides additional benefits over previous technologies.

BRIEF SUMMARY

A new computational tool for design optimization is disclosed which is referred to herein as a "Boundary Learning Optimization Tool" (BLOT). BLOT rapidly identifies the boundaries of performance capabilities achieved by general physical systems if their geometric parameters are allowed to vary from their smallest allowable feature sizes to their largest geometrically compatible feature sizes. The boundaries generated by BLOT fully define the design spaces of such physical systems and allow designers to visually identify which geometric versions of their synthesized topologies best achieve desired combinations of performance capabilities.

For instance, BLOT can be utilized to optimize the geometry of the flexure topologies synthesized using the freedom and constraint topologies (FACT) synthesis approach. In BLOT, artificial neural networks are trained to create sufficiently accurate models of parameterized physical system's topologies using a minimal number of numerically generated performance solutions generated from different design instantiations of those topologies. These models are then utilized by an efficient optimization process to plot the performance boundary of the desired topology. The model-training and boundary-plotting processes iterate using additional numerically or analytically generated solutions from each updated boundary that is generated until the final boundary is obtained, such as having a guaranteed accuracy within 10% average error. As a case study the disclosure uses BLOT to optimize a FACT-synthesized flexure topology.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1A through FIG. 1D are perspective views of a design topology example for which achievable ranges of motion and frequencies are determined according to an embodiment of the present disclosure.

DETAILED DESCRIPTION

Figure 1D:
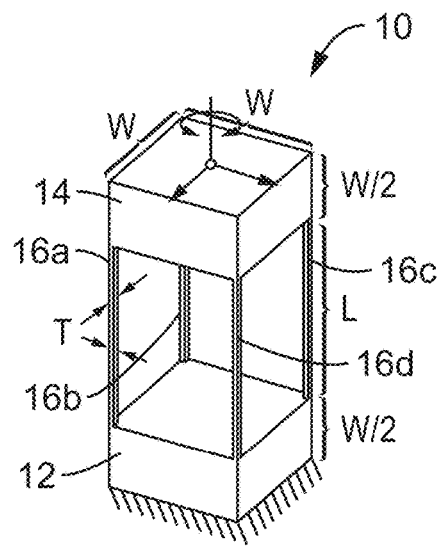
Figure 1D:
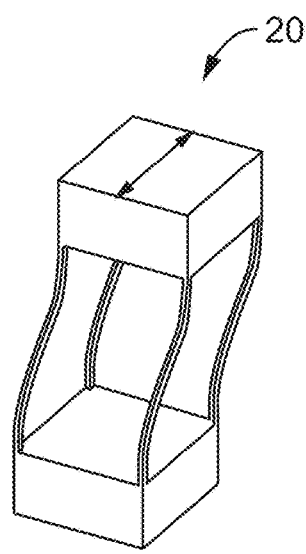
Figure 1D:
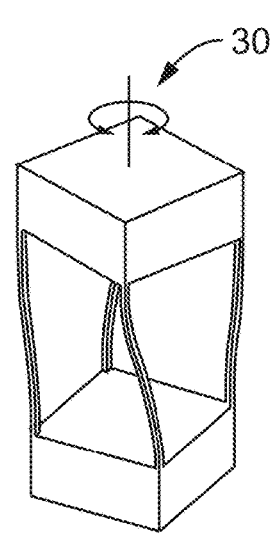
Figure 1D:
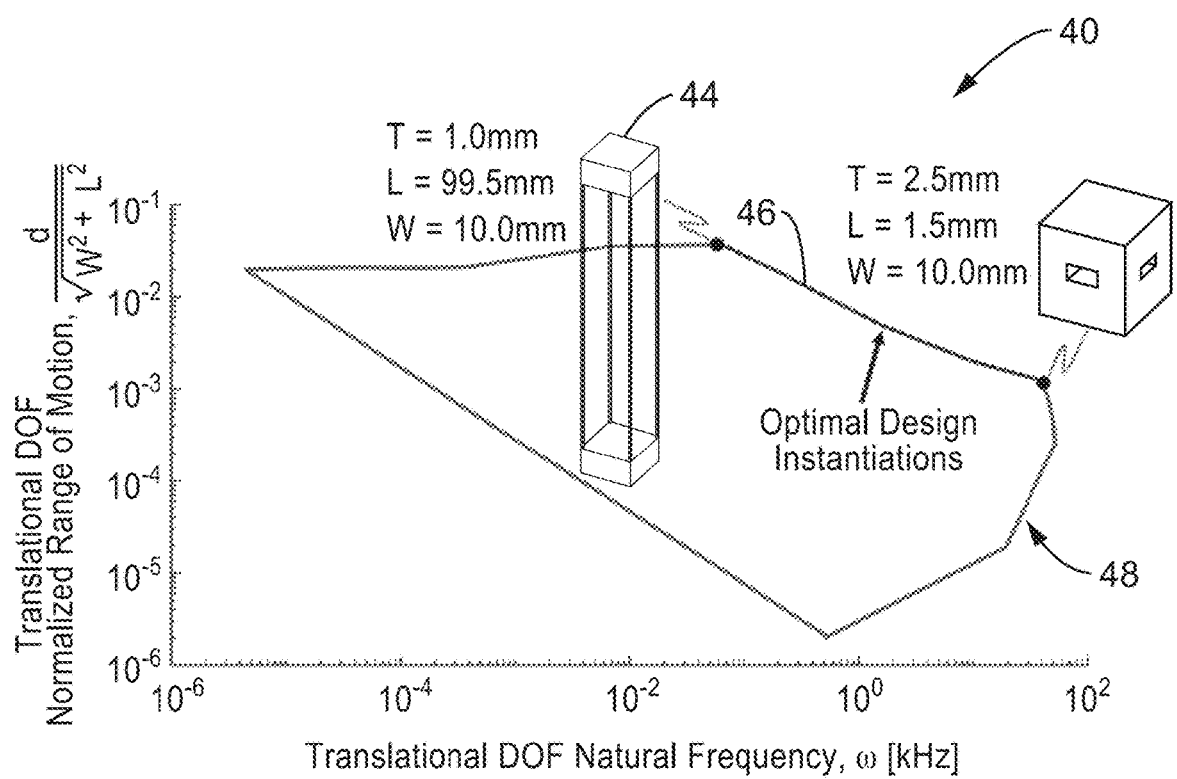

A tool is described for optimizing the geometry of general system topologies governed by constraints of physics (e.g., mechanical, electrical, magnetic). This tool, being referred to herein as "Boundary Learning Optimization Tool", or simply BLOT, utilizes the results generated from a minimal number of numerical or analytical simulations of the system using different geometric parameter values to construct a sufficiently accurate mathematical model of the topology by training an artificial neural network. This model is then used by BLOT to rapidly identify the boundary that circumscribes the combination of desired capabilities that can be achieved by every geometric instantiation of the topology without the need to calculate capabilities achieved by every design instantiation. Optimal design instantiations can then be selected from portions of the boundary plotted by BLOT.

FIG. 1A through FIG. 1D illustrate design topology and geometric parameters 10, 20, 30, 40 as an example for demonstrating the manner in which BLOT generates optimal flexure system designs. Consider the following example of a designer seeking to identify what geometric instantiation of the design topology 10 in FIG. 1A simultaneously achieves the largest range of motion and the highest natural frequency along the translational degree of freedom (DOF) shown in FIG. 1B for a given constituent material. It should be noted that the original FIG. 1B and FIG. 1C were color coded indicating the extent of translation, but are depicted herein as simple structure models for the sake of compatibility with patent office guidelines. It should be appreciated that the term "degrees of freedom", DOF, in a mechanical system is the number of independent parameters that define its configuration, for example the position and orientation of a rigid body in space is defined by three components of translation and three components of rotation, whereby it has six degrees of freedom. The DOF paradigm similarly applies to other physical systems. The more a flexure system can deform in a particular direction before it yields (i.e., its range of motion) with respect to its overall size and the higher its natural frequency corresponding with the mode shape along that direction, the easier it is to control the system at high speeds with precision over large ranges without undesired resonance effects. To identify a geometric instantiation that achieves this combination of capabilities, the designer should label the topology's features with independent geometric parameters that fully define its geometry.

Suppose for this example that the designer sets the rigid ground and rigid stage geometry to be the same rectangular prism 10 constrained by the parameter W as shown in FIG. 1A. The example prism 10 is shown with a rigid non-movable base 12 (e.g., depicted with thatched lines indicating its securement to an underlying surface), a top structure 14, and multiple wire elements 16a, 16b, 16c and 16d extending between base 12 and top 14. Suppose the four wire elements that join the four corners of these rigid bodies are set to each possess the same length, L, and the same square cross-section with a side length of T (i.e., the width and thickness of each wire element is T). In FIG. 1B and FIG. 1C design topology DOFs are shown for linear and rotational translations, respectively.

In working with this topology the designer would submit to BLOT the smallest achievable feature sizes for each of these three independent parameters as well as the largest geometrically compatible values for the same parameters. In at least one embodiment, the properties of the selected constituent materials are also provided as well as the tolerance capabilities of the available fabrication process to identify the smallest resolution increment by which each geometric parameter could be changed to sweep between these smallest and largest values. Using this information, BLOT rapidly determines the boundary that circumscribes the combination of desired capabilities (i.e., the ranges of motion, d, per system characteristic length, $\sqrt{L^2+W^2}$, and the natural frequencies, @n) that can be achieved along the direction of the translational DOF by every geometric instantiation of the topology for the given range of parameters.

If the smallest parameter values, for example, are set to $T_{min}=1$ mm, with $W_{min}=10$ mm, and $L_{min}=1$ mm and the largest parameter values are set to $T_{max}=50$ mm, $W_{max}=100$ mm, and $L_{max}=100$ mm, the boundary resulting from BLOT is shown in FIG. 1D for the example topology of FIG. 1A. In this example with a fixed size top and bottom block two shapes 42 and 44 are shown with their positions along an optimal segment 46 of an instantiations plot 48. In this example a resolution increment value of 0.5 mm was utilized with Aluminum as the constituent material having a Young's modulus of 69 GPa, a shear modulus of 26 GPa, a density of 2,705 kg/m³, and a yield strength of 105 MPa.

Once this boundary is known, the designer can select optimal design instantiations that simultaneously achieve the largest values of each of the desired capabilities from along the top-right portion 46 of the boundary as shown in FIG. 1D. Two extreme designs 42, 44 are exemplified corresponding to their locations depicted as large black dots lying on either end of the optimal portion of the plotted boundary.

It should be appreciated that although BLOT in at least one embodiment utilizes numerically generated data taken from a variety of corresponding design instantiations to train neural networks for creating an accurate model of the design topologies, alternate embodiments of BLOT can be implemented using closed-form analytical models of the parameterized topologies if such models are available. Closed-form analytical models are, however, difficult to construct and their assumptions usually only produce valid results for specific topologies or for limited ranges of geometric parameters that define other topologies. In view of these challenges the present disclosure focuses on a method to train neural networks for creating models based on the results of numerically generated data as this approach is more general than closed-form analytical approaches. It should also be noted that although BLOT is introduced as a tool for optimizing the geometry of flexure system topologies, it could also be applied to a host of other diverse optimization applications.

2. Model Generation via Neural Networks

This section summarizes the manner in which BLOT generates models of FACT-synthesized topologies by training artificial neural networks using a minimal number of numerical simulations performed on various geometric instantiations of these topologies.

Figure 2:
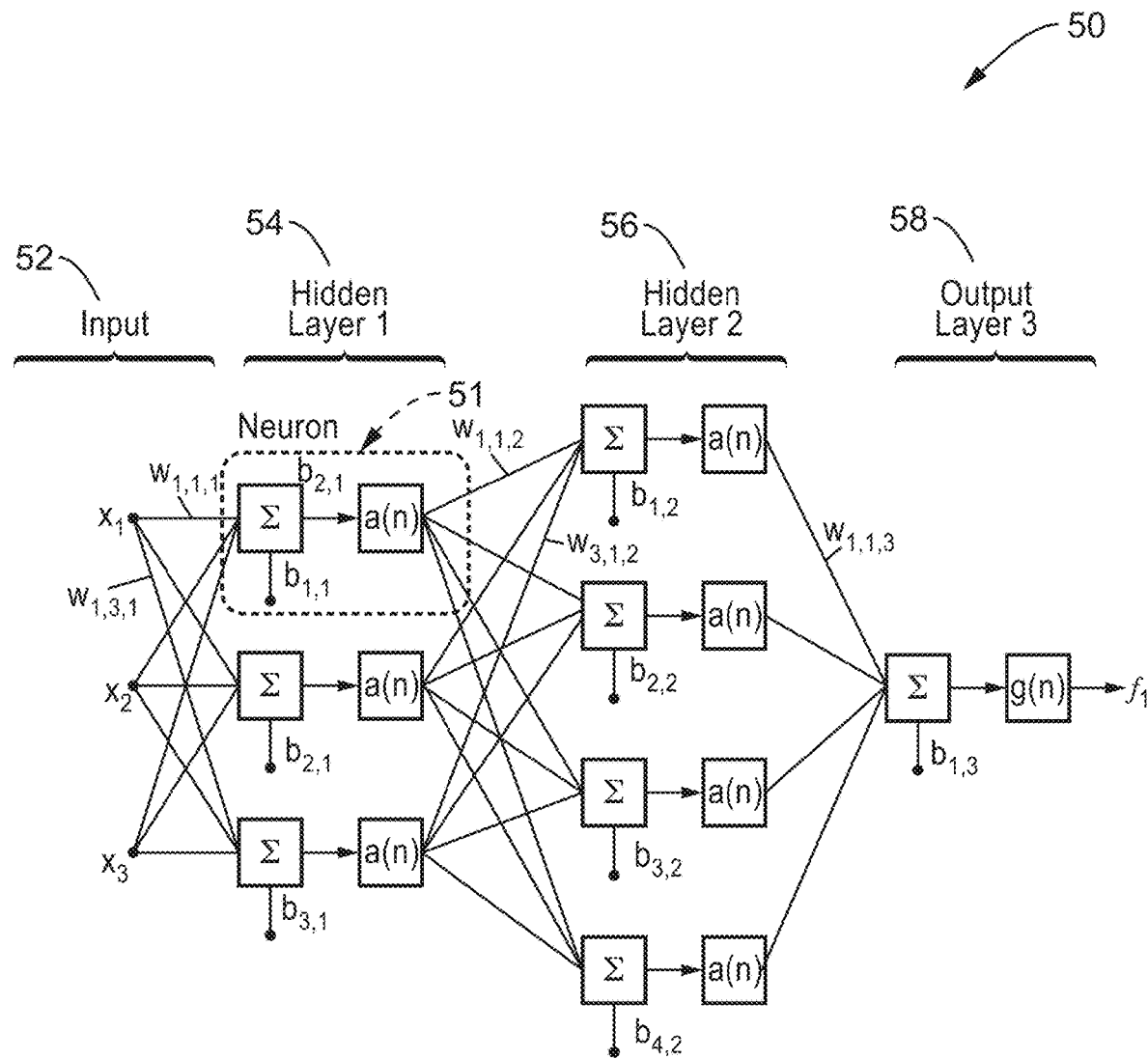
FIG. 2 is a layer diagram of an example neural network utilized according to an embodiment of the present disclosure.

FIG. 2 illustrates an example embodiment 50 of a plurality of neurons 51 in a neural network having an input section 52, showing multiple input connections depicted by way of example and not limitation with three inputs $x_1$, $x_2$, and $x_3$, multiple hidden layers which are shown by way of example and not limitation as a first hidden layer 54 and a second hidden layer 56, followed by an output layer 58 showing, by way of example and not limitation, a single output $f_1$.

Artificial neural networks, such as the one illustrated in FIG. 2, consist of several processing layers, which can be tuned to successfully map any inputs, $x_i$, to any corresponding outputs, $f_j$, when given a sufficient number of diversified input and corresponding target output values to learn from. In at least one embodiment, inputs comprise geometric parameters of a physical system (e.g., $x_1$=W, $x_2$=T, and $x_3$=L from the topology of FIG. 1A) and outputs representing performance capabilities (e.g., range of motion or natural frequency) achieved by the design instantiations that are defined by these corresponding input parameters. The known input and target output values are obtained using numerical (e.g., finite element analysis (FEA)) or analytical simulations on sample design instantiations with geometric parameters that span the topology's full design space from the smallest achievable feature sizes to the largest geometrically compatible values. The theory of this section provides a systematic way to train neural networks for creating sufficiently accurate flexure-system-topology models using a minimal number of known input and target output values so minimal computational effort and time are required by BLOT.

Once a sufficient number of known input and target output values have been calculated, the disclosed technique can employ any of various methods to use these values to iteratively tune the weights, $w_{e,t,l}$, and biases, $b_{t,l}$, within a neural network such that it can link any set of input values within the design space to accurate output values (i.e., the network can be trained to create an accurate predictive model). Bayesian regularization has been implemented as the preferred training algorithm for the neural network model. However, other training algorithms such as Levenberg-Marquardt can be utilized if needed.

The specific iterative process used in BLOT to generate accurate models of a general physical system is as follows. A user provides the independent geometric parameters that define the desired topology. The smallest and largest values for each of these parameters are also provided to specify the full design space over which the resulting model will accurately predict. BLOT then begins by generating all possible design instantiations that result from applying every combination of these smallest and largest values with three other evenly spaced values in between them (e.g., $T_{min}$, $(3T_{min}+T_{max})/4$, $(T_{min}+T_{max})/2$, $(T_{min}+3T_{max})/4$, and $T_{max}$) for every independent parameter to the topology's geometry. Each resulting design instantiation is checked for geometric compatibility against various geometric constraint functions, which are specific to their topology. Then BLOT passes the resulting geometrically compatible design instantiations to a computational platform which automatically creates computer-aided-design (CAD) models of these instantiations and performs numerical simulations of the governing physics of the problem to produce the target output values that correspond with each design instantiation defined by the given input values. Thus, large amounts of data can be acquired rapidly within the design space of general flexure topologies using the automated computational platform.

The numerically generated data is then randomly divided among two different sets, with 80% of the data assigned to a training set and the remaining 20% assigned to a testing set. The training data set is configured for receipt by a neural network for training the neural network. The neural network in at least one embodiment is configured with an initial-guess architecture. The neural network in at least one embodiment comprises inputs, at least two hidden layers and an output layer. In the example embodiment the second hidden layer starts out with zero neurons and the output layer with only one neuron. The number of neurons in the first hidden layer is initially set to a fixed number of neurons, such as 20 neurons while the number of neurons in the second hidden layer is initially set to zero. After training has been completed, the mean absolute percentage error, $MAPE_{total}$, for the total set of training and testing data combined is calculated using $$MAPE_{total} = \frac{100}{N_{total}} \sum_{k=1}^{N_{total}} \left| \frac{Q_{k,total} - H_{k,total}}{Q_{k,total}} \right| \tag{1}$$

where $N_{total}$ is the total number of target output values from both the training and testing sets combined, $Q_{k,total}$ are the target output values from both the training and testing sets, and $H_{k,total}$ are all the corresponding predicted output values calculated using the current trained network.

Thus, the $MAPE_{total}$ of the trained initial-guess network architecture (i.e., 20 neurons in the first hidden layer and 0 neurons in the second hidden layer) is used as the starting point for optimizing the network's architecture. A pattern search method is utilized to optimize the number of neurons in the network's architecture in two different phases. In the first phase, pattern search is used to optimize an architecture with no neurons in the second hidden layer. For this phase, the lower bound of neurons in the first hidden layer is set for example to 5 and the upper bound is set for example to 40, although other values can be utilized as desired. In this example the input tolerance is set to 1, the initial mesh size is set to 8, and the expansion factor is set to 2. The cost function that is minimized for this optimization is $MAPE_{total}$ as defined in Eq. (1).

Once the best trained network architecture is found using this first-hidden-layer optimization (i.e., the trained network architecture with the smallest $MAPE_{total}$), the mean absolute percentage error of the training, $MAPE_{training}$, and testing, $MAPE_{testing}$, data sets are each calculated using Eq. (1) for this best trained network architecture but with the subscripts currently labeled 'total' replaced by the words 'training' and 'testing' respectively. If both of these values (i.e., $MAPE_{training}$ and $MAPE_{testing}$) are equal to or less than a selected threshold, 35 in this example, the neural network is used as the initial model corresponding to the governing physics of the system. If however, either $MAPE_{training}$ or $MAPE_{testing}$ is greater than 35, a second phase of network-architecture optimization is initiated.

In the second phase, a pattern search method is again utilized to optimize network architecture but with more neurons in the first hidden layer, such as by way of example 40 neurons, with an initial-guess providing some neurons in the second hidden layer such as by way of example 4 neurons. By way of example and not limitation in this phase the lower bound of neurons in the second hidden layer is set to 1 and the upper bound is set to 15. The input tolerance is again set to 1 and the expansion factor is again set to 2. The best number of neurons in the second hidden layer of the network with 40 neurons in the first hidden layer is identified by minimizing the same cost function in Eq. (1), $MAPE_{total}$. Once the best trained network architecture is found using this second-hidden-layer optimization, the mean absolute percentage error of the training, $MAPE_{training}$, and testing, $MAPE_{testing}$, data sets are each calculated using Eq. (1) for this best trained network architecture but with the subscripts currently labeled 'total' replaced by the words 'training' and 'testing' respectively. If both of these values (i.e., $MAPE_{training}$ and $MAPE_{testing}$) are equal to or less than 35, the neural network is used in this embodiment as the initial model of the FACT synthesized flexure topology. If, however, either $MAPE_{training}$ or $MAPE_{testing}$ is greater than 35, the trained network architecture with the lowest $MAPE_{total}$ found from the network optimization of both the first and second phase is used as the initial model corresponding to the governing physics of the system.

Thus, using minimal computation, an initial model representing the physical system can be identified. It should be appreciated that many of the hard numbers chosen in this section were selected by way of example for rapidly generating accurate models of flexure system topologies with less than 10 independent geometric parameters. The numbers in this section may need to be adjusted for scenarios with larger numbers of input parameters.

3. Plotting Performance Boundaries

This section discusses the portion of BLOT that utilizes the models of flexure system topologies generated from Section 2 to plot their performance capability boundaries. It should be remembered that the geometric parameters of a flexure-system topology (e.g., W, T, and L for the topology of FIG. 1A) are the inputs, $x_i$, for the model and the performance capabilities (e.g., range of motion and natural frequency for the example of FIG. 1A) achieved by design instantiations that are defined by these corresponding input parameters are the outputs, $f_j$, for the model. For this section, a theoretical example of a system with only two inputs, $x_1$ and $x_2$, will be used to conceptually explain the process that plots the boundary that circumscribes the full design space for two of the system's achievable outputs, $f_1(x_1, x_2)$ and $f_2(x_1, x_2)$.

The boundary-plotting process first requires the smallest and largest values of each input parameter, $x_{i,min}$ and $x_{i,max}$ respectively, as well as resolution increment values, $\Delta x_i$, for each input parameter. Constraint functions should also be provided to define what combination of input values are permissible (e.g., W-2T>0 for the example of FIG. 1A).

Figure 3A:
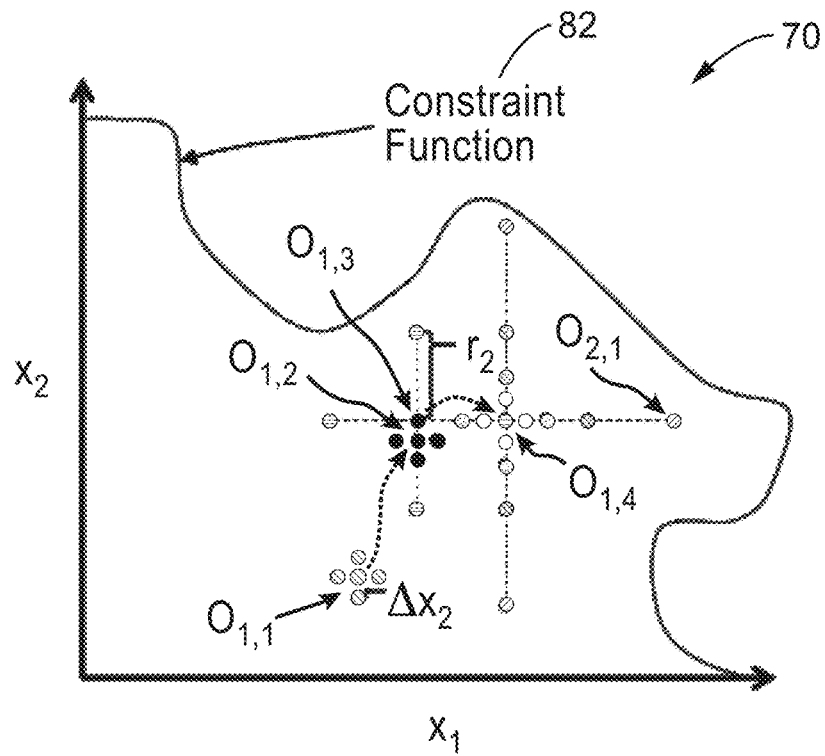
FIG. 3A through FIG. 3D are plots of theoretical inputs and corresponding output boundaries determined according to an embodiment of the present disclosure.
Figure 3B:
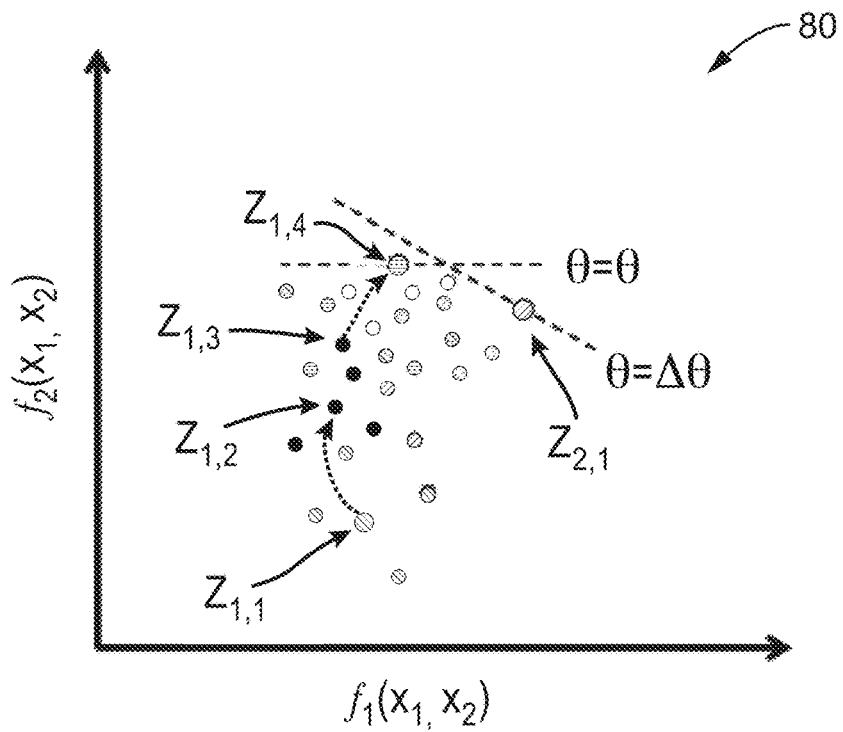
Figure 3C:
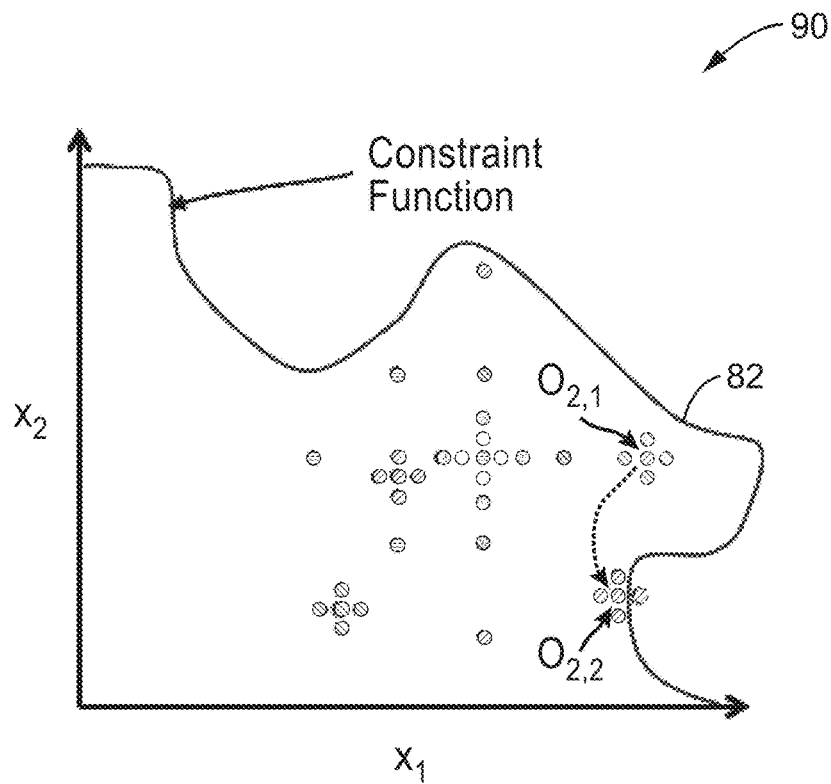
Figure 3D:
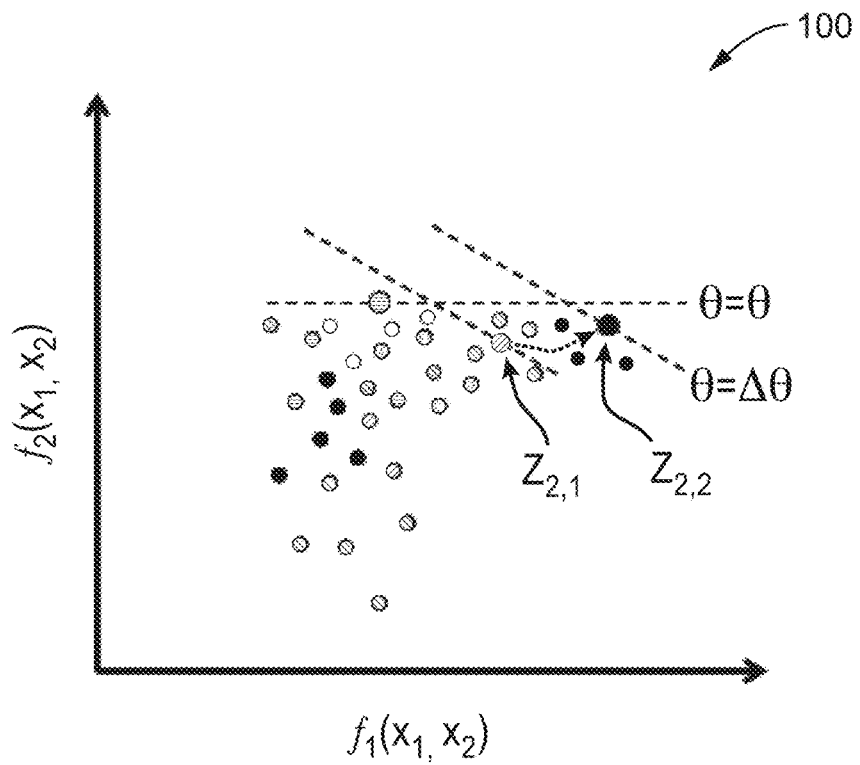

FIG. 3A through FIG. 3D illustrate a theoretical example of inputs and their corresponding plotted output boundaries according to an embodiment of the present disclosure. It should be noted that the original color coding of these small dots is depicted in this group of figures using various shading patterns so as to comply with patent office guidelines. In FIG. 3A is seen 70 progression of SQP and then ALPS optimization for $\theta=0$ initialized in the objective function in the input space; while FIG. 3B depicts 80 a corresponding output space. In FIG. 3C is seen a continued progression 90 of the same optimization processes for $\theta=\Delta\theta$ incremented in the objective function in the same input space; while FIG. 3D depicts 100 a corresponding output space.

Referring first to FIG. 3A the constraint function is shown as the spline boundary line 82. The process begins by supplying a randomly selected combination of permissible inputs, shown as the first type shaded dot (first direction of diagonal hatching) labeled $O_{1,1}$, to the Sequential Quadratic Programming (SQP) optimization operation. This operation first identifies a set of other permissible input combinations that result from adding and subtracting the resolution increment of each input, $\Delta x_i$, to and from the first randomly selected combination of inputs along each input's axis.

For the example of FIG. 3A, this first set of input combinations are shown as the four similarly shaded (first diagonal hatching) dots immediately surrounding the shaded dot labeled $O_{1,1}$. It should be noted that although $\Delta x_1$ is shown as being equal to $\Delta x_2$ in the example, these resolution increments do not have to be equal for other scenarios. The system's model is then used to map all of the combinations of these inputs about $O_{1,1}$ to their corresponding combinations of outputs, which are represented by these five first type shaded dots (same first direction of diagonal hatching) shown in FIG. 3B. It will be appreciated that the original input dot, $O_{1,1}$, of FIG. 3A maps to the output dot, $Z_{1,1}$ in FIG. 3B. The SQP process then approximates the gradient (i.e., first derivatives) and Hessian matrix (i.e., the symmetric matrix of second derivatives) of the objective function defined by $$J(x_1,x_2)=\cos(\theta)f_2(x_1,x_2)+\sin(\theta)f_1(x_1,x_2) \quad (2)$$

using the input and output combinations (i.e., the adjacent first type shaded dots (same first direction of diagonal hatching) in FIG. 3A and FIG. 3B), where $\theta$ in Eq. (2) is initially set to 0 (zero) so that the largest $f_2$ output can be pursued first. This gradient and Hessian matrix are then used to construct a Quadratic Programming (QP) sub-problem, which is solved to determine another combination of inputs that will map to combinations of outputs that produce a larger objective-function value.

In the example of FIG. 3A through FIG. 3D, suppose the new combination of inputs determined is shown as a second type shaded dot (solid black dot) labeled $O_{1,2}$ in FIG. 3A. Note that this dot's corresponding combination of outputs, as shown as the solid black dot labeled $Z_{1,2}$ in FIG. 3B, possesses an $f_2$ value that is larger than any of the other previous first type shaded dots (same first direction of diagonal hatching) depicted in the same figure. SQP then repeats this process by finding another set of permissible input combinations that result from adding and subtracting the resolution increment of each input, $\Delta x_i$, to and from the new combination of inputs (i.e., $O_{1,2}$ from FIG. 3A) along each input's axis.

For the example of FIG. 3A this new set of input combinations are shown as the four solid black dots immediately surrounding the solid black dot labeled $O_{1,2}$. It will be noted that each of the five solid black dots in FIG. 3A maps to a corresponding solid black dot in FIG. 3B. Thus, the SQP process rapidly finds an efficient path toward a local maximum of the objective function by iteratively stepping from one cluster of dots to the next in this manner. The SQP process terminates when either (i) the step distance from one central dot to the next (e.g., the distance between $O_{1,1}$ and $O_{1,2}$ in FIG. 3A) is smaller than the prescribed resolution of the input parameters, $\Delta x_i$, or (ii) the process fails to generate the next step, which typically occurs because the first or second derivatives of the objective function cannot be calculated. The latter reason typically occurs when the process encounters discontinuities within the objective function.

After SQP terminates, a boundary-plotting process of this disclosure continues the optimization by supplying the combination of permissible inputs that map to the combination of outputs that produce the largest objective-function value identified by SQP to Augmented Lagrangian Pattern Search (ALPS) optimization. For the example of FIG. 3A, suppose SQP was unable to step beyond the cluster of dots surrounding $O_{1,2}$ and thus terminated at that location. The combination of inputs that would be supplied to ALPS would be the solid black dot labeled $O_{1,3}$ in FIG. 3A since this combination of inputs maps to the combination of outputs that achieve the largest $f_2$ value found using SQP. This combination of outputs is shown as the solid black dot labeled $Z_{1,3}$ in FIG. 3B. ALPS first identifies a set of other permissible input combinations that result from adding and subtracting an initial mesh size, $r_i$, to and from the combination of inputs supplied to the process along each input's axis. For this example embodiment the initial mesh size, labeled $r_2$ in FIG. 3A, is typically set to 20% of the range of its corresponding input parameter (i.e., $r_i = 0.2|x_{i,max} - x_{i,min}|$).

For the example of FIG. 3A, the first set of ALPS-generated input combinations are shown as four third type shaded dots (horizontal hatching) surrounding the solid black dot labeled, $O_{1,3}$. It should be appreciated that although $r_1$ is shown as being equal to $r_2$ in the example, these mesh sizes are not typically equal for other scenarios. The system's model is then used to map the combinations of these inputs to their corresponding combinations of outputs, which are represented by the four third type shaded dots (all having the same horizontal hatching) shown in FIG. 3B.

ALPS then identifies if any of these combinations of inputs map to a combination of outputs that produce an objective-function value that is larger than any produced previously in the optimization process. Suppose, for instance, that the input combination of the example in FIG. 3A, labeled $O_{1,4}$, maps to the output combination, labeled $Z_{1,4}$ in FIG. 3B, which achieves the largest $f_2$ value previously identified. The ALPS process would then step to the dot representing that input combination (e.g., $O_{1,4}$).

The process would then identify a set of other permissible input combinations that result from adding and subtracting the previous mesh size (e.g., $r_i$ in this case) multiplied by an expansion factor to and from this combination of inputs along each input's axis. By way of example and not limitation the expansion factor is set in this case to 2. Thus, for the example of FIG. 3A, the next set of ALPS-generated input combinations are shown as the three fourth type shaded dots (second direction of diagonal hatching) surrounding the third type shaded dot (horizontal hatching) labeled, $O_{1,4}$. These fourth type shaded dots (second direction of diagonal shading) shown in FIG. 3A map to the three identically shaded dots shown in FIG. 3B. The process then identifies if any of these output combinations produce an objective-function value that is larger than any produced previously in the optimization process.

Since none of the third type shaded dots (horizontal hatching) in FIG. 3B possess an $f_2$ value that is larger than $Z_{1,4}$, ALPS would then identify a set of other permissible input combinations that result from adding and subtracting the previous mesh size (e.g., $2r_i$ in this case) divided by the same expansion factor to and from the combination of inputs labeled $O_{1,4}$ in FIG. 3A along each input's axis. Thus, for the example of FIG. 3A, the next set of ALPS-generated input combinations are shown as the three fifth type shaded dots (first direction of diagonal hatching plus speckles) surrounding the same third type shaded dots (horizontal hatching) labeled $O_{1,4}$. These three fifth type shaded dots (first direction of diagonal hatching plus speckles) shown in FIG. 3A map to the identically shaded three output dots shown in FIG. 3B.

Again, since none of these similarly shaded dots in FIG. 3B possess an $f_2$ value that is larger than $Z_{1,4}$, ALPS would then identify another set of other permissible input combinations that result from adding and subtracting the previous mesh size (e.g., $r_i$ in this case) divided by the same expansion factor to and from the combination of inputs labeled $O_{1,4}$ in FIG. 3A along each input's axis. Thus, for the example of FIG. 3A, the next set of ALPS-generated input combinations are shown as the four sixth type shaded dots (speckled) surrounding the same third type shaded dot (horizontal hatching) labeled $O_{1,4}$.

This process repeats until either (i) one of the new input combinations maps to an output combination with an objective-function value that is larger than any produced previously, or (ii) the mesh size becomes equal to or less than a specified input tolerance, which by way of example and not limitation is selected as the resolution of the input parameters, $\Delta x_i$. If the first option (i) occurs, the process will step to the improved input combination and the ALPS process will continue iterating. If the second option (ii) occurs, the ALPS process will terminate. For the example of FIG. 3A, the second option occurred because the mesh size of the four seventh type shaded dots (open-white filled dots) shown immediately surrounding the third type shaded dot (horizontal hatching), labeled $O_{1,4}$, is equal to $\Delta x_2$, labeled in the same figure, and none of the new output dots generated ever surpassed the $f_2$ value of $Z_{1,4}$ as shown in FIG. 3B.

Once SQP and ALPS have both run their full course for determining the maximum value of $J(x_1, x_2)$ from Eq. (2) for $\theta = 0$, the $\theta$ parameter is then incrementally increased by $\Delta\theta$, which is typically set to a value between $\pi/10$ to $\pi/20$. Using this new $\theta$ parameter, the value of the objective function in Eq. (2) is determined for all existing input combinations, which for the example described in this section are shown as dots in FIG. 3A. From among these input combinations, the one that produces the largest objective function value for $\theta = \Delta\theta$ corresponds to the input combination represented by the dot labeled $O_{2,1}$ in FIG. 3A, which maps to the output combination represented by the fourth type shaded dot (second direction of horizontal hatching) labeled $Z_{2,1}$ in FIG. 3B. Then the process supplies this input combination to SQP for generating additional input combinations that produce larger objective function values as described previously.

The four first type shaded dots (first direction of diagonal hatching) immediately surrounding the dot labeled $O_{2,1}$ in FIG. 3C would be identified first for the example of this section using this approach. Those four first type shaded dots map to the four new same shaded dots shown in FIG. 3D that surround the dot labeled $Z_{2,1}$. SQP then identifies the next input combination (e.g., $O_{2,2}$ shown in FIG. 3C) that produces a larger objective function value. It will be noted that the input combination dot, $O_{2,2}$, maps to an output combination dot, labeled $Z_{2,2}$ in FIG. 3D, that is farther away along the direction prescribed by the new $\theta$ parameter value (i.e., $\Delta\theta$). As SQP continues, four other input combinations would be identified that immediately surround the input combination dot labeled $O_{2,2}$ in FIG. 3C, which are seen as the second type shaded dots (solid black dots) in FIG. 3C.

However, it should be noted that one of the new dots lies outside the spline line 82 and thus represents a design instantiation that violates the geometric compatibility constraints imposed. Thus, only three of the new surrounding dots map to permissible output combinations as shown in FIG. 3D. The SQP process continues in this way until it terminates. ALPS then takes over where SQP left off, as described previously, until ALPS also terminates. Once ALPS terminates, the process will have found the input combination that achieves the largest objective function value identified from among those previously tested for θ=Δθ.

The disclosed process iterates this pattern of steps to identify the combinations of output values that lie farthest away along their prescribed directions defined by their corresponding θ value in a clockwise fashion until θ≥2π (i.e., all the directions have been swept). It is important to note that any time before the θ parameter is incrementally advanced, the objective function of Eq. (2) is rechecked for every combination of input values that have been evaluated up to that point to make sure that each of the previously identified output dots that used to be the farthest away along their prescribed directions are still the farthest away. If a new dot is ever identified that is farther away than a previous dot along a specific direction, θ, (i.e., if a new dot exceeds the dashed lines in FIG. 3B), the iterative process is reset to that direction and the process continues using that improved output dot.

Once this process is complete, all the combinations of output values are identified which lie along the boundary of a convex shape that circumscribes all the output dots determined and plotted using the system's model during the iterative process.

Figure 4A:
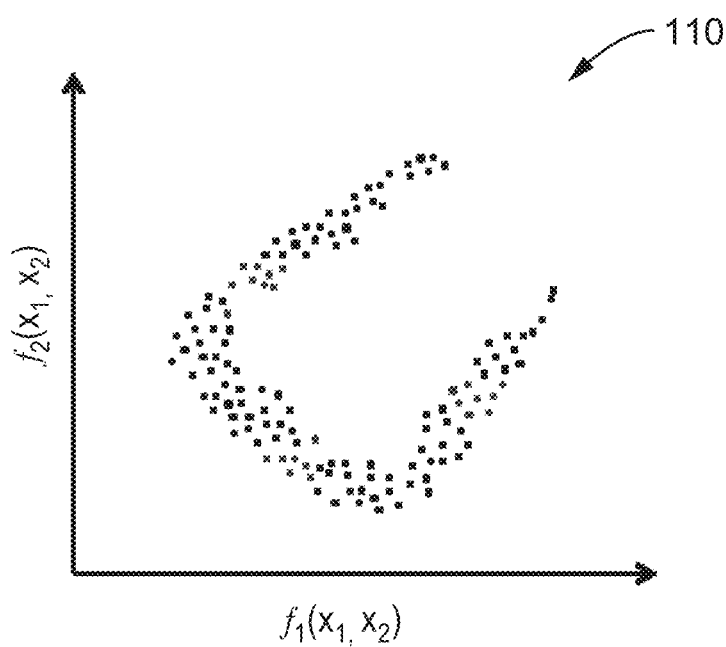
FIG. 4A through FIG. 4F are plots of outputs generated according to an embodiment of the present disclosure.
Figure 4B:
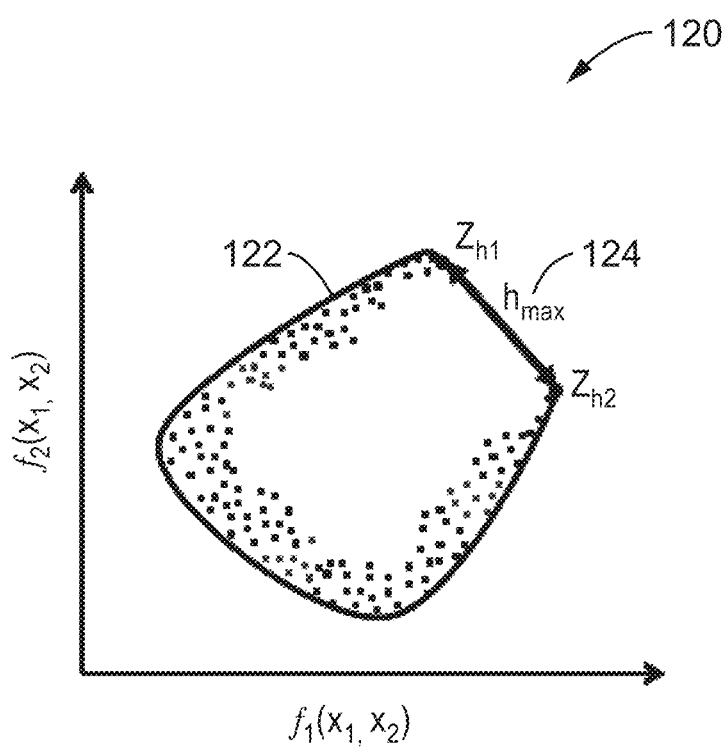
Figure 4C:
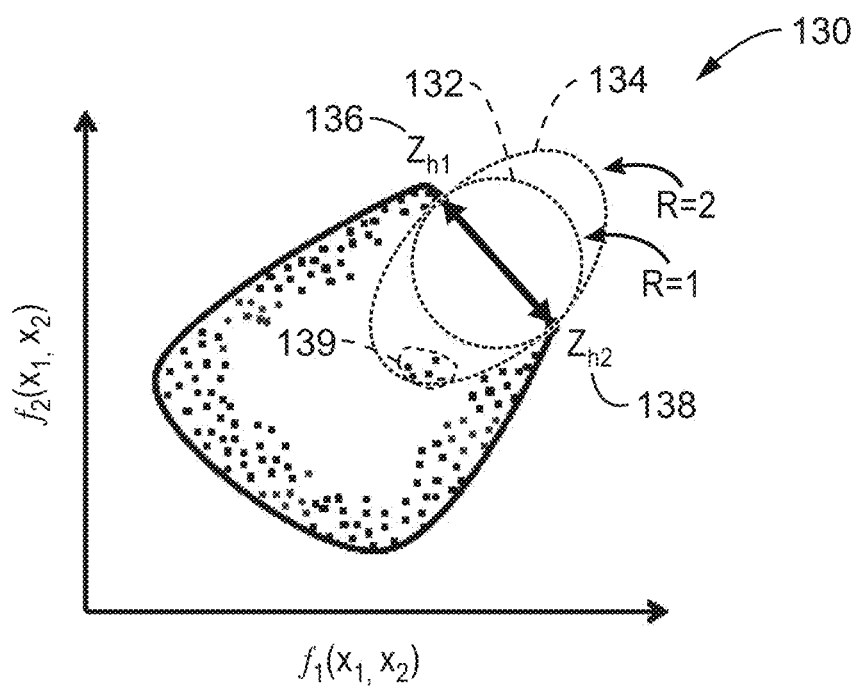
Figure 4D:
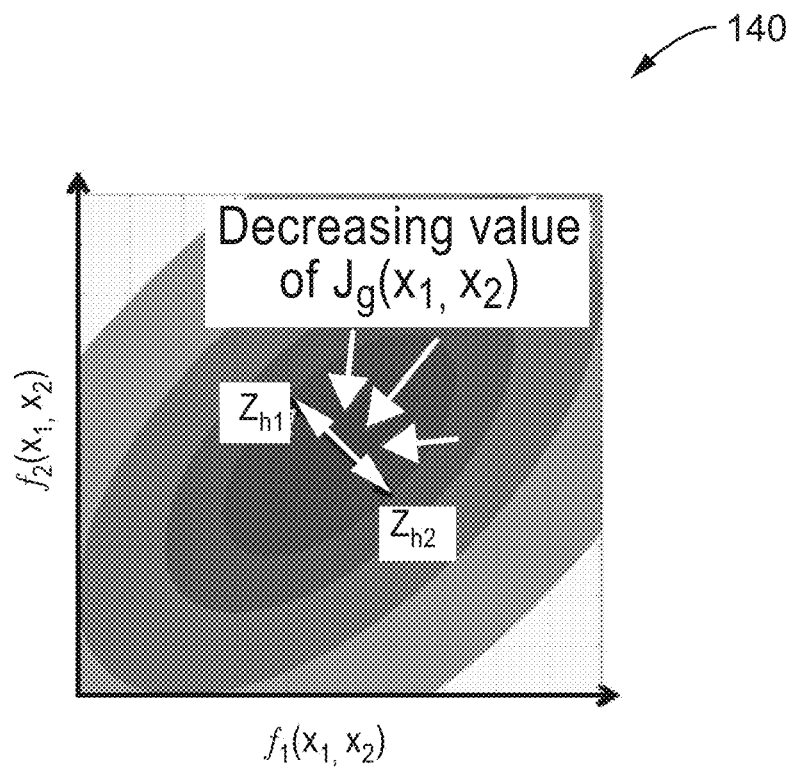
Figure 4E:
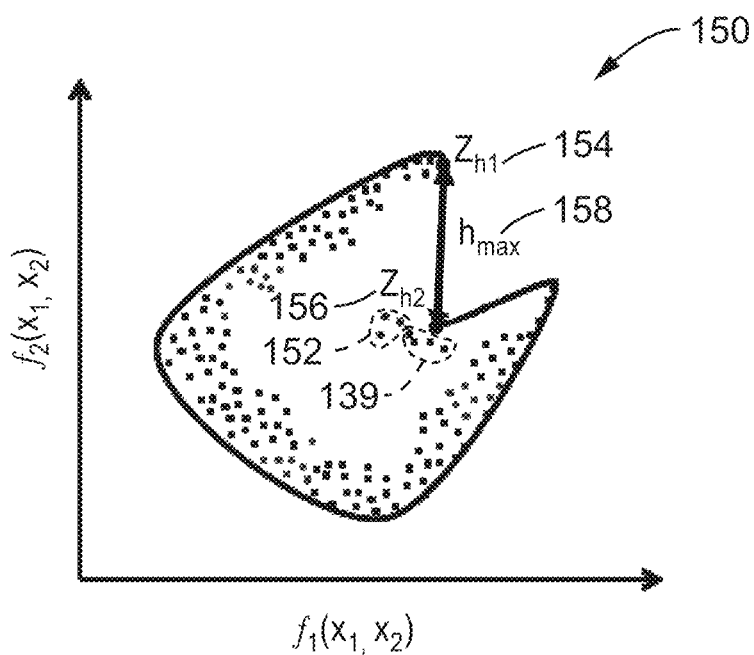
Figure 4F:
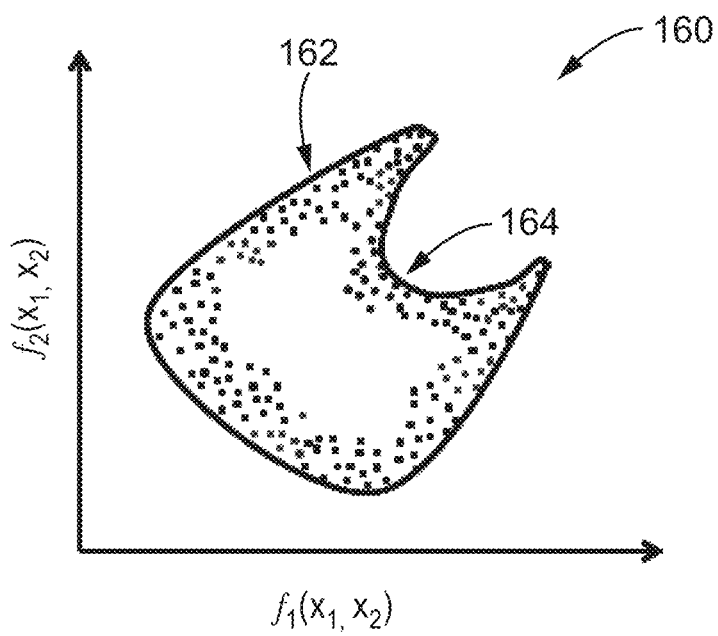

FIG. 4A through FIG. 4F illustrate outputs from an example embodiment of the present disclosure. In FIG. 4A is depicted 110 a generated cloud of output dots. In FIG. 4B is depicted 120 the convex boundary being first identified. In FIG. 4C is depicted 130 a new objective function minimized to identify other output dots within circular or elliptical regions. In FIG. 4D is depicted 140 an elliptical contour diagram of the new objective function with an R value of 2 is depicted. In FIG. 4E is depicted 150 the boundary being updated with a new $h_{max}$ value. In FIG. 4F is depicted 160 the process of successfully identifying boundaries that are concave. It should be noted that the original color coding of these small dots is depicted in this group of figures as merely shading to comply with patent office guidelines.

Many systems produce a cloud of output dots 110 that form a concave region as shown in FIG. 4A, and not a convex region. If these output dots are utilized to define the boundary of the example in FIG. 4A, the result would be the solid c-shaped line boundary 122 shown in FIG. 4B. This boundary would grossly overestimate the actual system's achievable performance space since it is convex instead of concave like the cloud of output dots. Thus, to address this issue, BLOT identifies all the vectors that point from each output dot along the existing boundary to their neighboring dots on the same boundary. The magnitude, $h_{max}$ 124, of the longest vector is identified because this vector points between the two output dots (e.g., $Z_{h1}$ and $Z_{h2}$ shown in FIG. 4B) that usually correspond to the opening of a previously unknown concave boundary. BLOT then determines a new objective function, $J_g(x_1, x_2)$, defined by $$J_g(x_1, x_2) = \left(\frac{\cos^2\alpha}{R^2} + \sin^2\alpha\right)\left(f_1(x_1, x_2) - \frac{f_{1,Zh1} - f_{1,Zh2}}{2}\right)^2 + \left(\frac{\sin^2\alpha}{R^2} + \cos^2\alpha\right)\left(f_2(x_1, x_2) - \frac{f_{2,Zh1} - f_{2,Zh2}}{2}\right)^2 + 2\sin\alpha\cos\alpha\left(\frac{1}{R^2} - 1\right)$$ (3)

-continued
$$\left(f_1(x_1, x_2) - \frac{f_{1,Zh1} - f_{1,Zh2}}{2}\right)\left(f_2(x_1, x_2) - \frac{f_{2,Zh1} - f_{2,Zh2}}{2}\right)$$

for all the input combinations that have been previously evaluated for R=1.

This objective function is minimized to identify output combinations that lie within circular 132 or elliptical 134 regions such as shown in FIG. 4C. If the R variable in Eq. (3) is 1, the region is a circle 132. However, if this variable increases (R>1) it becomes an increasingly elongated ellipse 134 as shown in FIG. 4C. The angle α in Eq. (3) is defined by $$\alpha = \arctan\left(\frac{f_{1,Zh2} - f_{1,Zh1}}{f_{2,Zh1} - f_{2,Zh2}}\right)$$ (4)

where $f_{1,Zh1}$ and $f_{2,Zh1}$ from Eqs. (3) and (4) are the horizontal and vertical components of the $Z_{h1}$ dot 136 seen in FIG. 4C, and $f_{1,Zh2}$ and $f_{2,Zh2}$ are the horizontal and vertical components of the $Z_{h2}$ dot 138 in the same figure.

After BLOT computes the objective function of Eq. (3) for all the input combinations that have been previously evaluated for R=1, it identifies the existing input combination that produces the smallest objective function value. This input combination is the combination that maps to the output combination that is closest to the center of the circle shown in FIG. 3C. If no output dots are found within the circle, the input combination corresponding to either the output dot $Z_{h1}$ or $Z_{h2}$ will be chosen as the closest to the center of the circle and is thus supplied to SQP and then ALPS described previously to evaluate new input combinations. For this SQP-ALPS optimization, however, the objective function in Eq. (3) is minimized for R=1 instead of maximizing the objective function of Eq. (2) for different values of θ as was done previously. Suppose, for this example that when this optimization is performed that the new group of output dots 139 in FIG. 4C is generated. Since none of these output dots lie within the interior of circle 132 as seen in the figure, the previous R value in the objective function of Eq. (3) is multiplied by a factor, in this example case a factor of 2, and the search region is expanded to an ellipse 134 shown in FIG. 4C.

In FIG. 4D is shown the elliptical contour diagram of $J_g(x_1, x_2)$ for this R value (i.e., R=2). If no output dots are found within the new ellipse, the process continues to iterate by multiplying the previous R value by the same factor of 2 to increase the elliptical search region further. For the example of FIG. 4C, however, there are output dots that lie within the elliptical search region corresponding to an R value of 2.

Thus, the input combination that maps to the output dot that lies within this region and possesses the smallest objective function value for R=2 is supplied to the SQP-ALPS optimization process to identify a better output dot that achieves an even smaller objective function value. This process produces new output dots, for example the new set of dots 152 shown in FIG. 4E. Whether these new output dots achieve a smaller objective function value or not, the output dot that achieves the smallest objective function value is identified and considered part of the system's performance boundary. It is thus redefined as either $Z_{h1}$ 154 or $Z_{h2}$ 156. In the example of FIG. 4E, the $Z_{h2}$ 156 output dot is the one that is redefined, and it should be noted that $h_{max}$ 158 is also updated.

This boundary learning process is repeated until both (i) the horizontal component of the boundary vector with the largest magnitude (i.e., $h_{max}$) is less than a set percentage of the horizontal distance across the full cloud of output values, and (ii) the vertical component of the same vector is also less than the same percentage of the vertical distance across the same cloud. In at least one embodiment, this percentage threshold is typically set between 5% and 10%. Additionally, before the largest boundary vector is updated with a new magnitude (i.e., $h_{max}$), the entire optimization process of this section is repeated using the previous objective function in Eq. (2) for all θ values to ensure that any new dots evaluated since using that objective function are allowed to improve the boundary's accuracy if possible. In this way both convex 162 and concave 164 boundaries, such as the concave boundary shown in FIG. 4F, can be identified that accurately define the system's achievable performance space.

A simple case study is performed to validate the performance of the boundary tracing described in this section. Suppose three normalized input parameters, $p_1$, $p_2$, and $p_3$, map to two output functions, $f_1$ and $f_2$, according to $$f_1(p_1, p_2, p_3) = p_1^3 + \frac{1}{2}p_2 \text{ and} \tag{5}$$

$$f_2(p_1, p_2, p_3) = p_3^3 + \frac{1}{2}p_2 \tag{6}$$

If the input parameters are constrained according to $$10p_1 + p_2 + 10p_3 \le 15 \text{ and} \tag{7}$$

$$P_1^2 + \frac{1}{100}P_2^2 + P_3^2 \le 1 \tag{8}$$

and each parameter's smallest and largest values range from 0 to 1 with a resolution increment of 0.01, the boundary of the region achieved by the functions of Eq. (5) and Eq. (6) can be found by plotting the output values for every permissible input value.

Figure 5A:
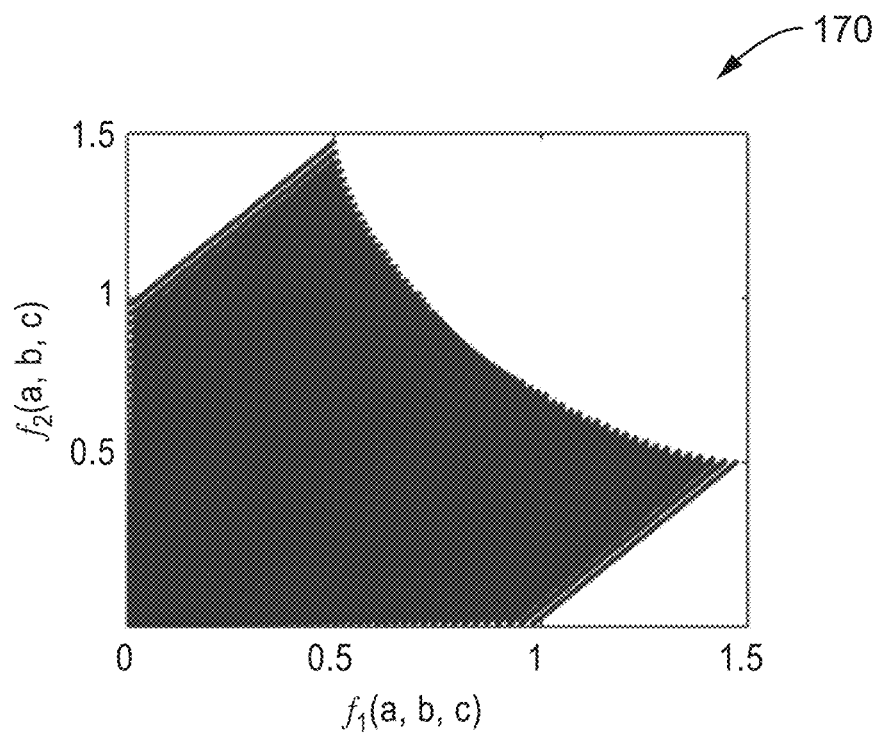
FIG. 5A and FIG. 5B are plots showing a full parameter sweep compared to a boundary identified with reduced parameters according to an embodiment of the present disclosure.
Figure 5B:
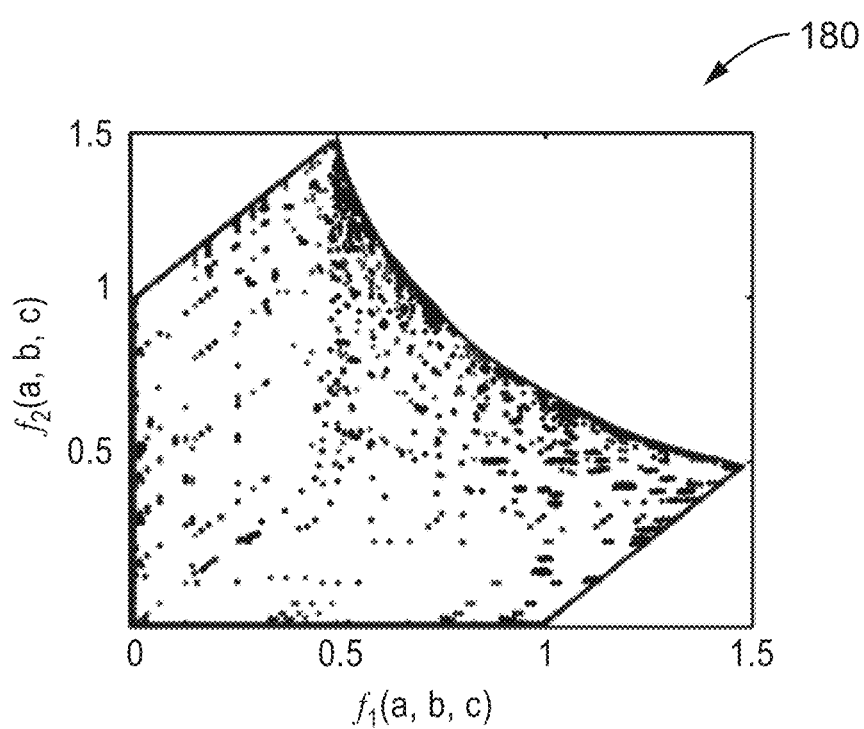

FIG. 5A through FIG. 5B illustrate plots 170, 180 of output values of a full parameter sweep in FIG. 5A, and for the boundary identified for the same example using BLOT in FIG. 5B. In FIG. 5A all these output values are seen plotted as overlapping black dots which are seen filling in the boundary. Another way to find the desired boundary, but with significantly fewer calculations, is to apply the process described in this section which results in a plot such as seen in FIG. 5B. It should be appreciated that the process has identified a boundary as seen in FIG. 5B, which is very close to the true boundary that contains all output values as seen in FIG. 5A, after determining and plotting only 2,612 dots instead of the 745,298 dots that were determined and plotted for the full parameter sweep of FIG. 5A.

4. Iterative Model and Boundary Refinement

This section provides the iterative process used to refine the initial neural-network-system models generated using the concepts of Section 2 as well as their corresponding performance-capability boundary identified using the concepts of Section 3. It should be noted that according to at least one embodiment a single neural network is trained for each desired output performance capability plotted, for example one neural network is trained to predict the flexure system's range of motion for the example of FIG. 1A and another neural network is trained to predict its natural frequency. The process begins by identifying all the design instantiations that lie along the first boundary plotted using the initial system models.

The automated computational approach discussed in Section 2 is then utilized to determine their desired performance capabilities and the results are saved as new sets of data, called boundary sets. The combined $MAPE_{boundary}$ of both sets of output performance capabilities is determined using Eq. (1) but with all the subscripts labeled 'total' replaced by the word 'boundary' and where $N_{boundary}$ is the total number of target output values from both sets of output performance capabilities summed together. If the resulting $MAPE_{boundary}$ is equal to or less than a set threshold, such as 10 by way of example and not limitation, the neural-network models pertaining to each output performance capability are used to generate the final boundary. If, however, this $MAPE_{boundary}$ is greater than this threshold (10 as per this example), then a large portion (e.g., 80%) of the new data is randomly added to the former training set of data described in Section 2 for each of the corresponding neural network models. The remaining portion (e.g., 20%) of the boundary data set is added to the former testing set of data that is also described in Section 2. The entire process of Section 2 through Section 4 are then repeated as new boundary data is added to the full body of previously acquired data until the $MAPE_{boundary}$ is equal to or less than the threshold (e.g., 10). Once this condition is satisfied, the final neural-network models used to predict the output performance capabilities are used to plot the final boundary of the system's performance capabilities using the concepts described in Section 3. In this way, all the points that constitute the final performance boundary plotted using BLOT for any flexure system are guaranteed to be accurate within an a given average error, such as within 10% or less using the example values. In practice, however, the vast majority of the final points plotted using BLOT will achieve significantly less error along their boundaries.

5. Flexure System Case Study Using BLOT

This section uses the FACT-synthesized flexure-system topology of FIG. 1A as a detailed case study to demonstrate the capabilities of BLOT. Suppose the smallest and largest values for each of the case study's three independent parameters (i.e., W, T, and L), its resolution increment, and the properties of its constituent material are all set to be the same values as those given in Section 1. Using the W-2T>0 constraint function provided earlier, BLOT can be used to train various neural networks to create models that map any desired geometric parameter values within the design space to design instantiations that achieve desired performance capabilities. The performance capabilities of interest to this case study included (i) the topology's range of motion along its translational DOF direction as shown in FIG. 1B, (ii) the natural frequency of the topology that corresponds with the mode shape of its translational DOF, (iii) the topology's angular range of motion about its rotational DOF as shown in FIG. 1C, and (iv) the natural frequency of the topology that corresponds with the mode shape of its rotational DOF.

The computational script that automates the collection of all the target data was set to ground the entire top surface of the fixed body shown with thatched lines in FIG. 1A on the side where the four wire elements are attached. The range of motion of each design instantiation along the direction of the translational DOF was calculated using FEA simulations by applying a shear force on the entire bottom face of the system's stage on the side where the four wire elements are attached. The magnitude of this shear force was gradually increased until any portion within the system began to yield according to Mises yield criterion. The largest amount the stage translated before reaching this yield criterion was defined to be the range of motion, d, of the corresponding design instantiation. This range of motion was normalized by dividing it by its characteristic length, $\sqrt{L^2+W^2}$.

The angular range of motion of each design instantiation about the rotational DOF was also calculated using FEA simulations by applying two opposing shear forces on either side of the system's stage to create a pure moment along the direction of the axes of the wire elements. The magnitude of this moment was gradually increased until any portion within the system began to yield according to Mises yield criterion. The largest amount the stage rotated before reaching this yield criterion was defined to be the angular range of motion, $\Phi$, of the corresponding design instantiation. The natural frequencies, $\omega_n$, corresponding to both of the translational and rotational DOF mode shapes for each design instantiation were also calculated using finite element modal analysis simulations. A unique neural network with a single neuron output layer was trained for each of the four performance capabilities of interest.

Once BLOT successfully created four accurate models of the flexure system topology of FIG. 1A by training four neural networks to each map arbitrary design instantiations of the topology to any of the four desired performance capabilities of interest, BLOT then plotted final boundaries that circumscribe the achievable combinations of these performance capabilities.

Figure 6A:
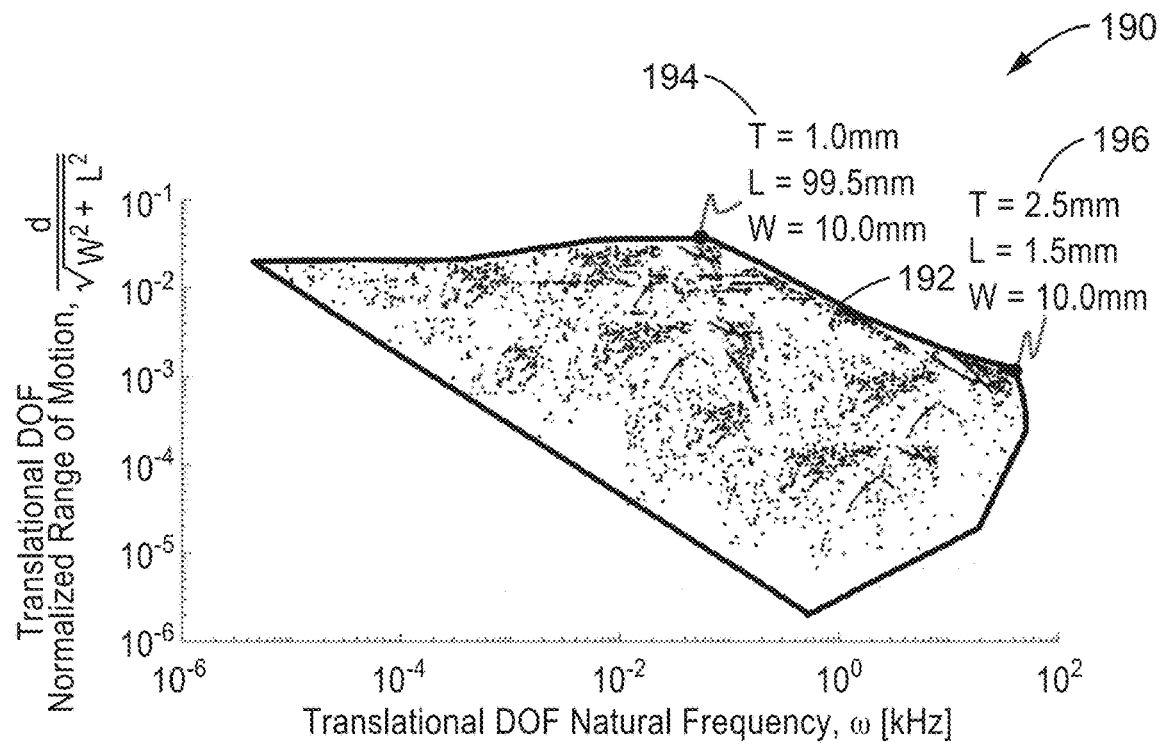
FIG. 6A and FIG. 6B are plots of achievable topology boundary ranges of motion and natural frequencies corresponding to translational DOF and rotational DOF generated according to an embodiment of the present disclosure.
Figure 6B:
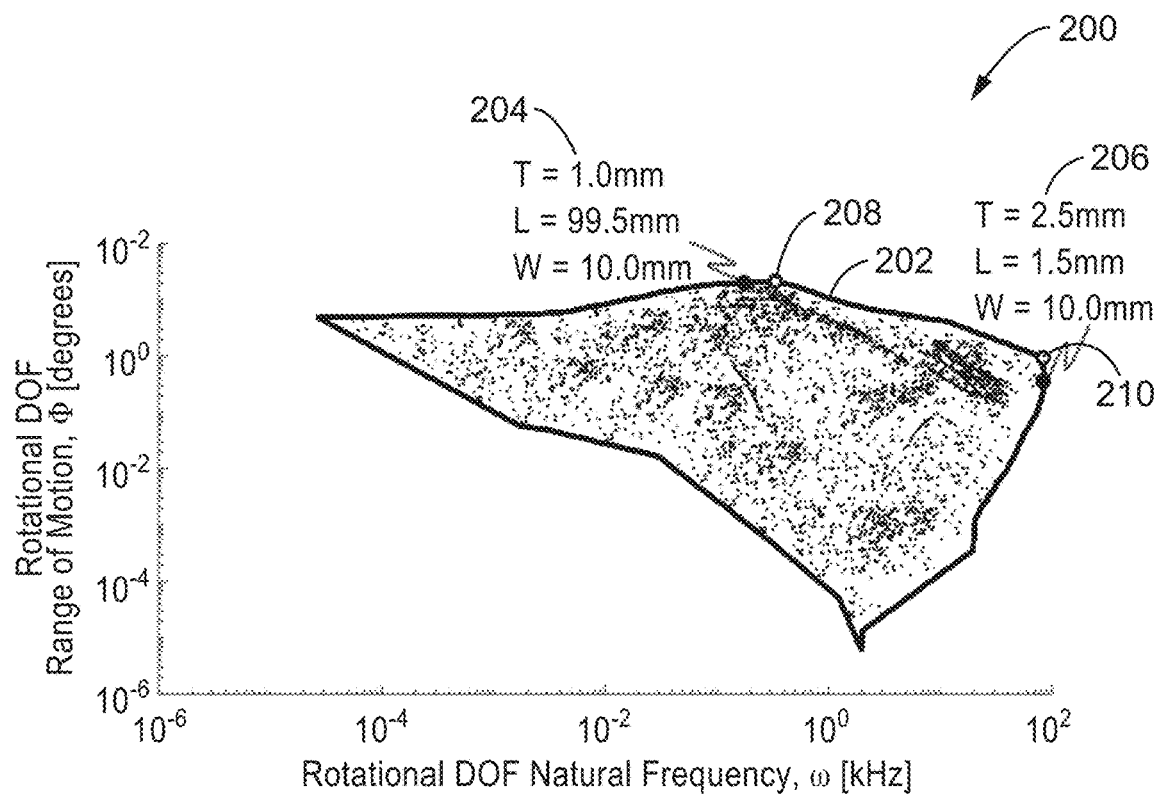

FIG. 6A and FIG. 6B illustrate topological boundaries 190, 200 of achievable ranges of motion and natural frequencies corresponding to the translational DOF in FIG. 6A and rotational DOF in FIG. 6B as generated by BLOT. The boundary corresponding to the normalized range of motion and natural frequency of the mode shape along the direction of the translational DOF is shown in FIG. 6A. It should be noted that this was the same boundary provided in FIG. 1D, however, the plot in FIG. 6A includes the shaded output dots used to identify the final boundary. The geometric parameters for two optimized design instantiations that span between the optimal portion of the boundary are provided in FIG. 1D as 46 and in FIG. 6A as 192 between the large black dots 194 and 196. Other optimal design instantiations can be selected from this portion of the boundary to achieve different maximum combinations of the performance capabilities. The boundary corresponding to the angular range of motion and natural frequency of the mode shape about the rotational DOF is provided in FIG. 6B. It should be recognized that the two optimal design instantiations shown as large black dots within the plots of FIG. 1D and FIG. 6A are also plotted in their corresponding locations within the boundary 202 provided in FIG. 6B between large black dots 204 and 206.

Although these design instantiations are not the two optimal design instantiations within the plot of FIG. 6B, they are close to the optimal instantiations, which are shown as large white dots 208 and 210 in FIG. 6B. Finally, it is worth noting that the plots of FIG. 6A and FIG. 6B are presented using a log-log scale. Since such plots can never achieve zero or negative values, BLOT establishes a cutoff threshold when identifying the boundary to more rapidly and clearly define a practical region of achievable performance capabilities, which in these example plots was set to $10^{-6}$.

6. Conclusions

This disclosure describes an optimization tool called a boundary learning optimization tool (BLOT), which utilizes an automated method for training neural networks to rapidly create accurate models of general physical systems. BLOT uses these models to rapidly plot the boundaries of regions containing the combinations of desired performance capabilities that are achievable by different design instantiations of the physical systems. Both the neural network training and boundary identification portions of BLOT are iterated using additional boundary data until the final boundary is guaranteed to be accurate within a desired level of average error, such as being less than 10% average error in at least one embodiment of the present disclosure. A flexure system is provided and optimized as a case study.

7. General Scope of Embodiments

The enhancements described in the presented technology can be readily implemented for boundary learning optimization of various physical systems. It should also be appreciated that systems for optimizing neural learning are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with providing neural learning. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for boundary learning optimization on flexure systems, the apparatus comprising: (a) an artificial neural network having an input layer, multiple intermediate layers and an output layer; (b) a processor configured for training said artificial neural network and analyzing output from models of parameterized flexure from said artificial neural network; and (c) a non-transitory memory storing instructions executable by the processor; (d) wherein said instructions, when executed by the processor, perform one or more steps comprising: (d)(i) training said artificial neural network to provide sufficiently accurate models of parameterized flexure using a minimal number of numerically generated performance solutions generated from different design instantiations of topologies; (d)(ii) plotting a performance boundary of a desired topology using models output by said artificial neural network in an optimization step on said processor; and (d)(iii) wherein said apparatus identifies the boundaries of performance capabilities achieved by general flexure system topologies if their geometric parameters are varied from smallest allowable feature sizes to largest geometrically compatible feature sizes for given constituent materials; (e) whereby boundaries of performance capabilities plotted by said apparatus fully define the design spaces of flexure systems toward allowing designers to visually identify which geometric versions of their synthesized topologies best achieve desired combinations of performance capabilities; and (f) wherein said apparatus trains neural networks for creating models based on the results of numerically generated data.

2. A method for boundary learning optimization on flexure systems, the method comprising: (a) training an artificial neural network to provide sufficiently accurate models of parameterized flexure using a minimal number of numerically generated performance solutions generated from different design instantiations of those topologies; (b) plotting a performance boundary of a desired topology using models output by said artificial neural network in an optimization step performed by a processor executing instructions stored in a non-transitory memory; and (c) identifying boundaries of performance capabilities achieved by general flexure system topologies if their geometric parameters are varied from smallest allowable feature sizes to largest geometrically compatible feature sizes for given constituent materials; (d) whereby performance boundaries plotted by said method fully define the design spaces of flexure systems toward allowing designers to visually identify which geometric versions of their synthesized topologies best achieve desired combinations of performance capabilities.

3. An apparatus for boundary learning optimization on flexure systems, the apparatus comprising: (a) an artificial neural network having an input layer, multiple intermediate layers and an output layer; (b) a processor configured for training said artificial neural network and analyzing output from models of parameterized flexure from said artificial neural network; and (c) a non-transitory memory storing instructions executable by the processor; (d) wherein said instructions, when executed by the processor, perform one or more steps comprising: (d)(i) training said artificial neural network to provide sufficiently accurate models of parameterized flexure using a minimal number of numerically generated performance solutions generated from different design instantiations of those topologies; (d)(ii) plotting a performance boundary of a desired topology using models output by said artificial neural network in an optimization step on said processor; and (d)(iii) wherein said apparatus identifies the boundaries of performance capabilities achieved by general flexure system topologies if their geometric parameters are varied from smallest allowable feature sizes to largest geometrically compatible feature sizes for given constituent materials; (e) whereby boundaries generated by said apparatus fully define the design spaces of flexure systems so that designers can visually identify which geometric versions of their synthesized topologies best achieve desired combinations of performance capabilities.

4. A method for boundary learning optimization on flexure systems, the method comprising: (a) training an artificial neural network to provide sufficiently accurate models of parameterized flexure using a minimal number of numerically generated performance solutions generated from different design instantiations of those topologies; (b) plotting a performance boundary of a desired topology using models output by said artificial neural network in an optimization step performed by a processor executing instructions stored in a non-transitory memory; and (c) identifying boundaries of performance capabilities achieved by general flexure system topologies if their geometric parameters are varied from smallest allowable feature sizes to largest geometrically compatible feature sizes for given constituent materials; (d) whereby boundaries generated by said method fully define the design spaces of flexure systems so that designers can visually identify which geometric versions of their synthesized topologies best achieve desired combinations of performance capabilities.

5. The apparatus or method of any preceding embodiment, wherein said apparatus is configured as a complementary tool for use with freedom and constraint topologies (FACT) synthesis approach, in which said apparatus optimizes geometry of flexure topologies synthesized using FACT.

6. The apparatus or method of any preceding embodiment, wherein said performance boundary of a desired topology circumscribes a combination of desired capabilities that can be achieved by every geometric instantiation of the desired topology without the need to calculate capabilities achieved by every design instantiation.

7. The apparatus or method of any preceding embodiment, wherein said plotting of a performance boundary comprises iterating using additional numerically or analytically generated solutions from each updated boundary that is generated until the final boundary is obtained to a given level of accuracy.

8. The apparatus or method of any preceding embodiment, wherein said numerically generated performance solutions comprise a training set and a testing set, and wherein said training set is configured for receipt by a neural network for training the neural network.

9. The apparatus or method of any preceding embodiment, wherein said neural network is configured with an initial-guess architecture.

10. The apparatus or method of any preceding embodiment, wherein said instructions when executed by the processor further perform one or more steps comprising training a single neural network for each desired output performance capability plotted.

11. The apparatus or method of any preceding embodiment, wherein said boundary learning optimization on flexure systems apparatus utilizes an automated method for training neural networks to rapidly create accurate models of general physical systems.

12. The apparatus or method of any preceding embodiment, wherein each of said performance capabilities is associated with a degree of freedom in the physical system.

13. The apparatus or method of any preceding embodiment, wherein said method is configured as a complementary tool for use with freedom and constraint topologies (FACT) synthesis approach, in which said apparatus optimizes geometry of flexure topologies synthesized using FACT.

14. The apparatus or method of any preceding embodiment, wherein said performance boundary of a desired topology circumscribes a combination of desired capabilities that can be achieved by every geometric instantiation of the desired topology without calculating capabilities achieved by every design instantiation.

15. The apparatus or method of any preceding embodiment, wherein said plotting of a performance boundary comprises iterating using additional numerically or analytically generated solutions from each updated boundary that is generated until the final boundary is obtained to a given level of accuracy.

16. The apparatus or method of any preceding embodiment, wherein said numerically generated performance solutions comprise a training set and a testing set, and wherein said training set is configured for receipt by a neural network for training the neural network.

17. The apparatus or method of any preceding embodiment, wherein said neural network is configured with an initial-guess architecture.

18. The apparatus or method of any preceding embodiment, wherein said method performs training of a single neural network for each desired output performance capability plotted.

19. The apparatus or method of any preceding embodiment, wherein said boundary learning optimization on flexure systems apparatus utilizes an automated method for training neural networks to rapidly create accurate models of general physical systems.

20. The apparatus or method of any preceding embodiment, wherein each of said performance capabilities is associated with a degree of freedom in the physical system.

21. The apparatus or method of any preceding embodiment, wherein said apparatus is configured as a complementary tool for use with freedom and constraint topologies (FACT) synthesis approach, in which said apparatus optimizes geometry of flexure topologies synthesized using FACT.

22. The apparatus or method of any preceding embodiment, wherein said performance boundary of a desired topology circumscribes a combination of desired capabilities that can be achieved by every geometric instantiation of the desired topology without having to calculate capabilities achieved by every design instantiation.

23. The apparatus or method of any preceding embodiment, wherein said method is configured as a complementary tool for use with freedom and constraint topologies (FACT) synthesis approach, in which said apparatus optimizes geometry of flexure topologies synthesized using FACT.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for boundary learning optimization on flexure systems, the apparatus comprising:
    (a) an artificial neural network having an input layer, multiple intermediate layers and an output layer;
    (b) a processor configured for training said artificial neural network and analyzing output from models of parameterized flexure from said artificial neural network; and
    (c) a non-transitory memory storing instructions executable by the processor;
    (d) wherein said instructions, when executed by the processor, perform one or more steps comprising:
        (i) training said artificial neural network to provide sufficiently accurate models of parameterized flexure using a minimal number of numerically generated performance solutions generated from different design instantiations of topologies;
        (ii) plotting a performance boundary of a desired topology using models output by said artificial neural network in an optimization step on said processor; and
        (iii) wherein said apparatus identifies the boundaries of performance capabilities achieved by general flexure system topologies if their geometric parameters are varied from smallest allowable feature sizes to largest geometrically compatible feature sizes for given constituent materials;
    (e) whereby boundaries of performance capabilities plotted by said apparatus fully define the design spaces of flexure systems toward allowing designers to visually identify which geometric versions of their synthesized topologies best achieve desired combinations of performance capabilities; and
    (f) wherein said apparatus trains neural networks for creating models based on the results of numerically generated data.

2. The apparatus of claim 1, wherein said apparatus is configured as a complementary tool for use with freedom and constraint topologies (FACT) synthesis approach, in which said apparatus optimizes geometry of flexure topologies synthesized using FACT.

3. The apparatus of claim 1, wherein said performance boundary of a desired topology circumscribes a combination of desired capabilities that can be achieved by every geometric instantiation of the desired topology without the need to calculate capabilities achieved by every design instantiation.

4. The apparatus of claim 1, wherein said plotting of a performance boundary comprises iterating using additional numerically or analytically generated solutions from each updated boundary that is generated until the final boundary is obtained to a given level of accuracy.

5. The apparatus of claim 1, wherein said numerically generated performance solutions comprise a training set and a testing set, and wherein said training set is configured for receipt by a neural network for training the neural network.

6. The apparatus of claim 1, wherein said neural network is configured with an initial-guess architecture.

7. The apparatus of claim 1, wherein said instructions when executed by the processor further perform one or more steps comprising training a single neural network for each desired output performance capability plotted.

8. The apparatus of claim 1, wherein said boundary learning optimization on flexure systems apparatus utilizes an automated method for training neural networks to rapidly create accurate models of general physical systems.

9. The apparatus of claim 1, wherein each of said performance capabilities is associated with a degree of freedom in the physical system.

10. A method for boundary learning optimization on flexure systems, the method comprising:
(a) training an artificial neural network to provide sufficiently accurate models of parameterized flexure using a minimal number of numerically generated performance solutions generated from different design instantiations of those topologies;
(b) plotting a performance boundary of a desired topology using models output by said artificial neural network in an optimization step performed by a processor executing instructions stored in a non-transitory memory; and
(c) identifying boundaries of performance capabilities achieved by general flexure system topologies if their geometric parameters are varied from smallest allowable feature sizes to largest geometrically compatible feature sizes for given constituent materials;
(d) whereby performance boundaries plotted by said method fully define the design spaces of flexure systems toward allowing designers to visually identify which geometric versions of their synthesized topologies best achieve desired combinations of performance capabilities.

11. The method of claim 10, wherein said method is configured as a complementary tool for use with freedom and constraint topologies (FACT) synthesis approach, in which said apparatus optimizes geometry of flexure topologies synthesized using FACT.

12. The method of claim 10, wherein said performance boundary of a desired topology circumscribes a combination of desired capabilities that can be achieved by every geometric instantiation of the desired topology without calculating capabilities achieved by every design instantiation.

13. The method of claim 10, wherein said plotting of a performance boundary comprises iterating using additional numerically or analytically generated solutions from each updated boundary that is generated until the final boundary is obtained to a given level of accuracy.

14. The method of claim 10, wherein said numerically generated performance solutions comprise a training set and a testing set, and wherein said training set is configured for receipt by a neural network for training the neural network.

15. The method of claim 10, wherein said neural network is configured with an initial-guess architecture.

16. The method of claim 10, wherein said method performs training of a single neural network for each desired output performance capability plotted.

17. The method of claim 10, wherein said boundary learning optimization on flexure systems apparatus utilizes an automated method for training neural networks to rapidly create accurate models of general physical systems.

18. The method of claim 10, wherein each of said performance capabilities is associated with a degree of freedom in the physical system.

* * * * *